UNITED STATES PATENT OFFICE.

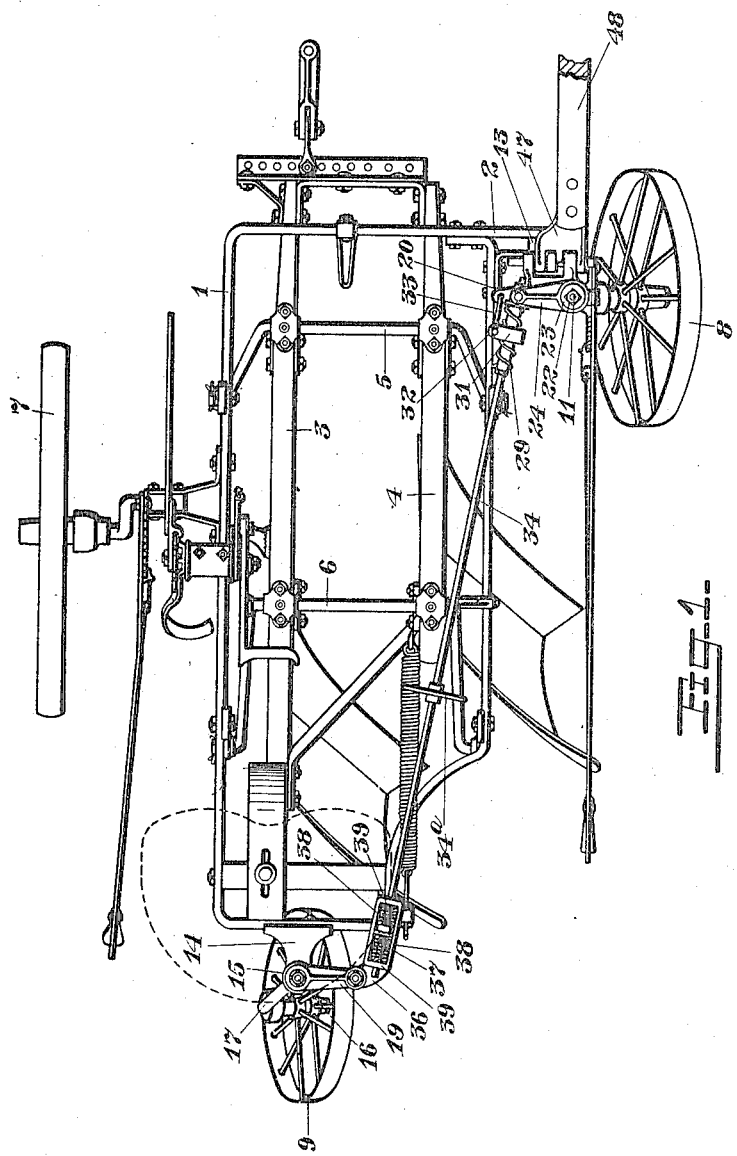

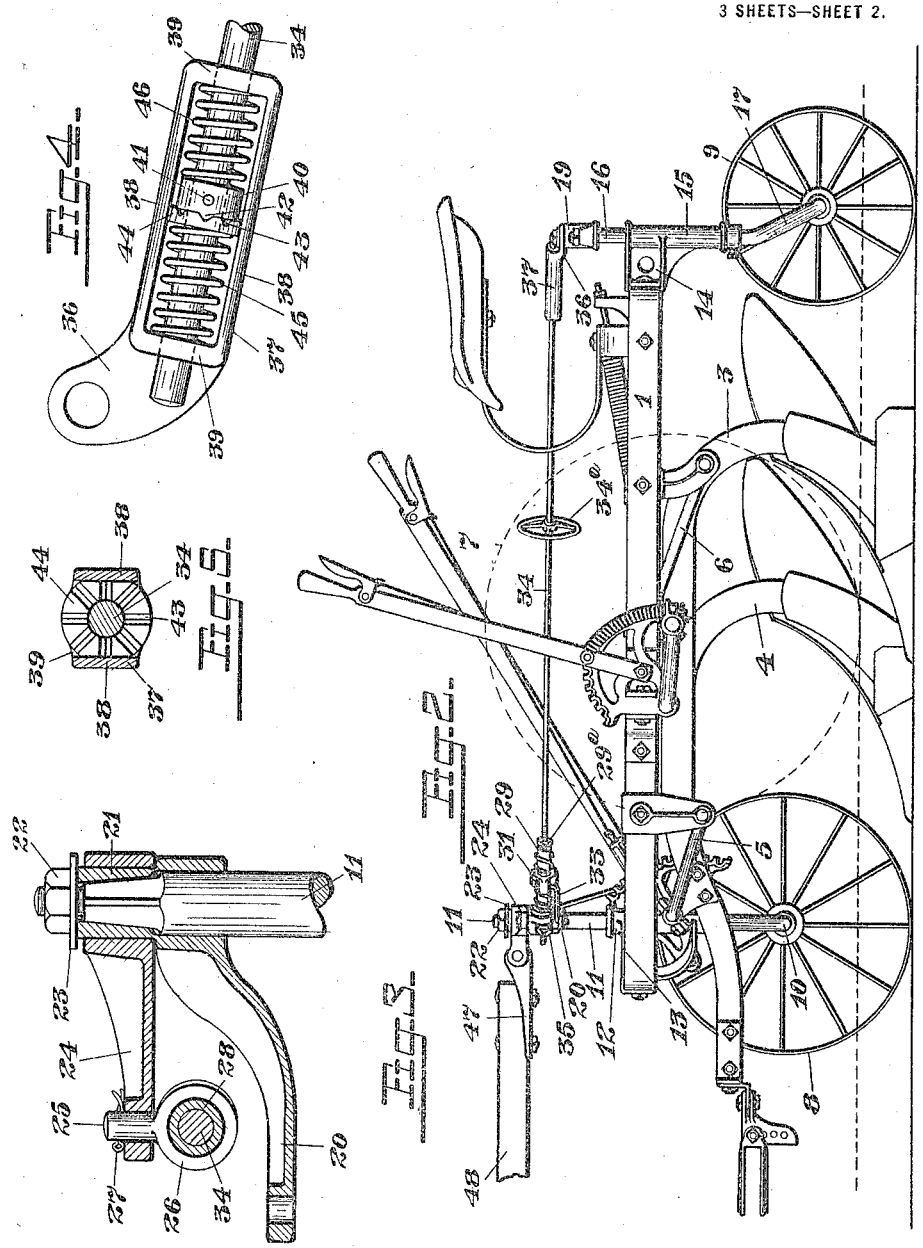

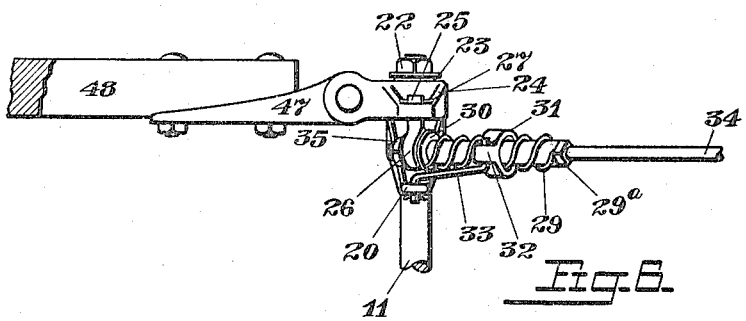
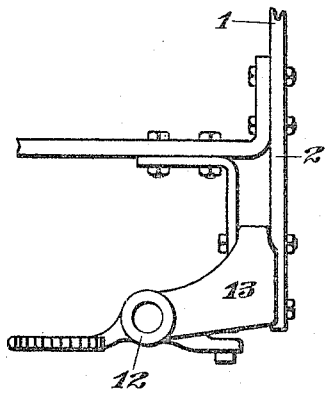
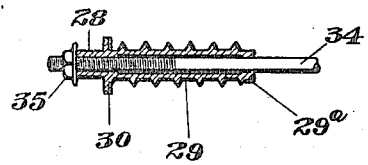

OTIS W. HOWARD, OF MOLINE, ILLINOIS, ASSIGNOR TO DEERE AND COMPANY, OF MOLINE, ILLINOIS, A CORPORATION OF ILLINOIS.

SULKY-PLOW.

1,221,992.  Specification of Letters Patent.  Patented Apr. 10, 1917.

Application filed August 9, 1915. Serial No. 44,549.

*To all whom it may concern:*

Be it known that I, OTIS W. HOWARD, a citizen of the United States, residing at Moline, in the county of Rock Island and State of Illinois, have invented certain new and useful Improvements in Sulky-Plows, of which the following is a specification, reference being had therein to the accompanying drawing.

My invention relates to wheeled plows, dirigible through adjustment of certain of the supporting wheels, and more particularly relates to the means employed by which such wheels are controlled and operated separately or together.

Referring to the drawings in which similar numerals indicate identical parts—

Figure 1 is a plan view of a wheeled plow illustrating the application of my invention.

Fig. 2 is a side elevation with the land wheel removed, and

Figs. 3, 4, 5, 6, 7, and 8 are details.

The plow frame 1 consists preferably of a single bar bent to the shape shown and having its ends brought together at the front with one end 2 projecting furrowward beyond the side of the frame. Beams 3 and 4 are supported on bails 5 and 6 journaled in bearings on the frame 1; plows of a well known type are carried by the beams 3 and 4.

The plow frame is supported on a land wheel 7, a front caster wheel 8 and a rear caster wheel 9. The front caster wheel 8 rotates on the crank end 10 of an axle having a vertical spindle 11 journaled in a sleeve 12; the sleeve 12 is preferably integral with a bracket 13 mounted on part 2 of the frame 1. Secured on the rear of the frame 1 is a bracket 14 having a sleeve 15 in which is journaled a vertical spindle 16 forming part of a crank axle 17, the lower end of the crank axle having mounted thereon the rear caster wheel 9. Projecting in a furrowward direction is an arm 19 rigidly secured on the upper end of the spindle 16. An inwardly extending arm 20 is mounted on the upper end of the spindle 11, a sleeve 21, integral with the arm 20 having a squared or angular opening to fit snugly over the similarly shaped upper end of the vertical spindle 11, the extremity of which is threaded to receive a nut 22 which holds the sleeve 21 and arm 20 securely in place; a washer 23 is used between the end of the sleeve 21 and the nut 22. Mounted to extend inwardly and to turn on the sleeve 21 is an arm 24 shorter in length than the arm 20 and having a vertical opening in which is inserted to turn freely therein, a stem 25 forming part of a collar 26, a pin or cotter 27 holding the stem from withdrawal.

Fitting loosely in the collar 26 is a portion 28 of a sleeve 29, the longitudinal movement of the sleeve in the collar 26 being limited by a shoulder or collar 30 on the sleeve 29. The sleeve 29, from the rear end thereof to the shoulder or collar 30 has its surface threaded, the threads having preferably a wide lead. Upon the threaded portion of the sleeve 29, and engaging therewith, is a traveler 31 having a projection 32; the upwardly bent end of a link 33 is inserted in a perforation in the projection 32, the link 33 extending forwardly and having a downwardly bent end passing through a perforation in the end of the arm 20. The sleeve 29 can be adjusted by means of a nut $29^a$ preferably formed integral therewith, the turning of the nut turning the sleeve 29 at the same time.

Passing through the sleeve 29 is the forward portion of a steering rod 34 threaded to engage with a similar thread on the interior of the portion 28 of the sleeve 29, so that the latter can be adjusted longitudinally on the rod 34 and held in any position of adjustment by a jam nut 35. The steering rod 34 extends rearwardly to an arm 36 pivotally connected to the arm 19 on the vertical spindle 16 of the crank axle 17. Forming part of the arm 36 is a casing 37 with top and bottom open and having side walls 38 and end walls 39; the steering rod 34 passes through openings in the end walls 39 and is retained in the casing 37 in the following manner; a collar 40 is rigidly secured on the steering rod 34 by any suitable means, in this instance by a pin 41, and has one or more teeth 42 which are adapted to engage with radial grooves 43 in the face of a member 44, the latter slidably held in the casing 37, the member 44 having a central opening through which the steering rod 34 loosely passes. A coil spring 45 on the steering rod 34 between the member 44 and an end wall 39 of the casing 37, and a similar coil spring 46 between the collar 40 and the other end wall 39, holds the collar 40 and the member 44 in close contact and absorb any shock to which the furrow wheels may be subjected. Rigidly secured on the steering rod 34 is a hand wheel 34ª adapted to be manually operated to turn the steering rod 34. A pole plate 47 to which a pole 48 is attached, is hinged to the arm 24 by a horizontal pivot to permit a vertical movement of the pole.

The operation of my improvements is as follows: As before stated, the arms 20 and 24 are connected by means of the link 33 which is attached to the arm 20 and to the traveler 31 on the sleeve 29, the latter being adjustably mounted on the steering rod 34 and connected to the arm 24; the steering rod 34 is likewise connected with the standard 16 of the crank axle 17 on which the rear caster wheel 9 is journaled, it therefore follows that the caster wheels swing simultaneously when the pole 48 is moved to right or left.

It is often necessary to change the line of travel of the front caster wheel 8, particularly when plowing on a hillside, without altering the line of travel of the machine, in order to offset the tendency of the plow to slide when the wheels are running in the furrows and parallel to the line of draft; the change in the line of travel of the front caster wheel 8 is effected by operation of the hand wheel 34ª which is rigidly mounted on the steering rod 34; turning the hand wheel 34ª to the left, or toward the center of the plow, will rotate the steering rod 34 and as the sleeve 29 is secured on the forward part of the steering rod 34 it is rotated simultaneously with the latter so that the traveler 31, having threaded engagement with the sleeve 29, is moved rearwardly thereon. The traveler 31 is connected to the arm 20 by the link 33 consequently as the traveler 31 is moved rearwardly the arm 20, rigid on the standard 11, is actuated to rotate the standard 11 until the front caster wheel 8 is at the required degree of angularity to the line of draft to offset the tendency to slide sidewise. By turning the hand wheel 34ª in the reverse direction the parts described will be actuated to adjust the front caster wheel to flare outwardly. It will be at once apparent that my device is operative to move both caster wheels by side motion of the pole 48, yet the same mechanism is operable to adjust the front caster wheel irrespective of the pole or the rear caster wheel. If it is desired to adjust the rear caster wheel out of parallelism with the furrow, I loosen the jam nut 35, and holding the sleeve 29, I rotate the steering rod 34, a threaded portion of which engages with the interior threaded portion of the sleeve 29, until the desired adjustment of the rear caster wheel 9 is made; as a longitudinal movement of the sleeve 29 will also adjust the front caster wheel 8, after the rear caster wheel 9 is adjusted, I return the front caster wheel 8 to its original position by rotating the hand wheel as will be readily understood.

My device is simple in construction and operation and comprises in one compact mechanism means to adjust either caster wheel independently of the pole or of each other.

What I claim is—

1. In a plow having front and rear caster wheels, crank axles on which said wheels are journaled and having vertical spindles rotatable in bearings on the plow, a laterally projecting loosely supported arm on the spindle of the front crank axle, a draft device connected to said arm, a similar arm rigidly mounted on said spindle and connected with the first mentioned arm, a laterally projecting arm rigidly mounted on the spindle of the rear crank axle, a steering rod connecting said arms to swing both wheels simultaneously, and means to rotate the steering rod to vary the angle of one wheel with the other irrespective of the draft device.

2. In a plow having front and rear caster wheels, crank axles on which said wheels are journaled and having vertical spindles rotatable in bearings on the plow, a laterally projecting arm rigidly mounted on the spindle of the front crank axle, a similar arm loosely supported on said spindle and connected with the first mentioned arm and having a draft device connected therewith, a laterally projecting arm rigidly mounted on the spindle of the rear crank axle, a steering rod connecting said arms to simultaneously swing said wheels in opposite directions, and means to rotate the steering rod to vary the angle of one wheel with the other irrespective of the draft device.

3. In a plow having front and rear caster wheels, crank axles on which said wheels are journaled and having vertical spindles rotatable in bearings on the plow, a laterally projecting arm having a sleeve rigidly mounted on the spindle of the front crank axle, a similar arm loosely supported on said sleeve and connected with the first mentioned arm, a draft device attached to said loosely supported arm, a laterally projecting arm rigidly mounted on the spindle of the rear crank axle, a steering rod connecting the front and rear arms to swing both wheels simultaneously by movement of the draft device, and means to rotate the steering rod to vary the angle of one wheel with the other irrespective of the draft device.

4. In a plow having front and rear caster wheels, crank axles on which said wheels are journaled, said crank axles having vertical spindles rotatable in bearings on the plow, a laterally projecting arm rigidly mounted on the spindle of the front crank axle, a similar arm loosely supported on said spindle, a draft device attached to the latter arm, a sleeve pivotally supported on the latter arm having a threaded surface, a traveler on said sleeve and having threaded engagement therewith, a link connecting said traveler with the first mentioned arm, an arm rigidly mounted on the spindle of the rear crank axle and having a steering rod connected with said arm, the steering rod projecting through said sleeve and adjustably connected thereto, said rod adapted to swing both wheels by operation of the draft device, and means to rotate the steering rod to vary the angle of one wheel with the other irrespective of the draft device.

In testimony whereof I affix my signature, in presence of two witnesses.

OTIS W. HOWARD.

Witnesses:
 JESSIE SIMSER,
 W. G. DUFFIELD.

Copies of this patent may be obtained for five cents each, by addressing the "Commissioner of Patents, Washington, D. C."